Feb. 17, 1970   HITOSHI KAWAI ET AL   3,496,083
METHOD FOR REMOVING CATIONIC IONS FROM WATER THINNABLE
PAINT DURING ELECTROLYTICAL DEPOSITION COATING
Filed Sept. 27, 1967
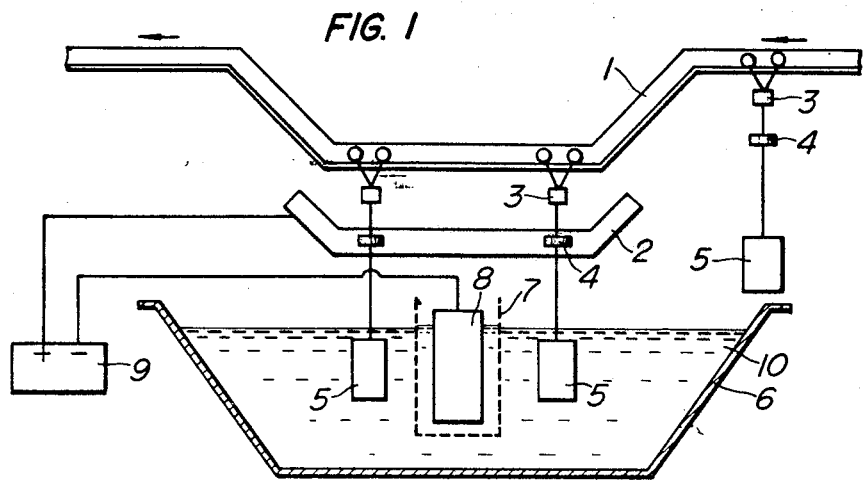
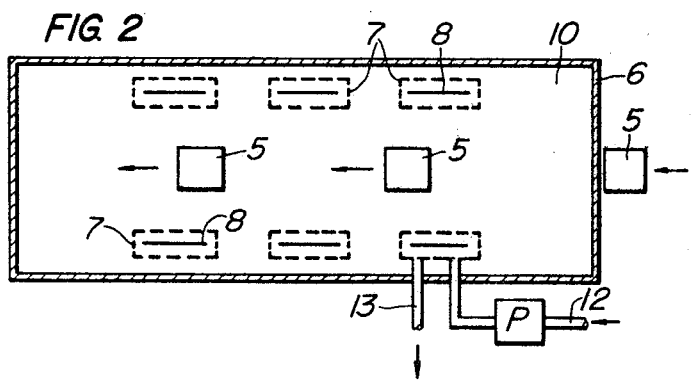
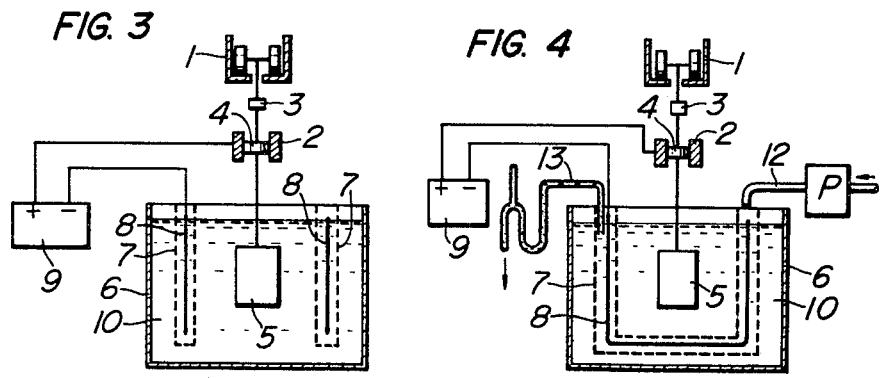
INVENTORS
HITOSHI KAWAI,
MAKOTO MIKAWA, &
DAISABURO TASHIRO
BY Browne, Schuyler Beveridge
ATTORNEY 3,496,083
METHOD FOR REMOVING CATIONIC IONS FROM WATER THINNABLE PAINT DURING ELECTROLYTICAL DEPOSITION COATING
Hitoshi Kawai, Neyagawa-shi, Makoto Mikawa, Takatsuki-shi, and Daisaburo Tashiro, Kobe-shi, Japan, assignors, by mesne assignments, to Toyo Kogyo Company Limited, Hiroshima, Japan, a corporation of Japan
Filed Sept. 27, 1967, Ser. No. 670,905
Claims priority, application Japan, Oct. 4, 1966, 41/64,938
Int. Cl. B01k 5/02; C23b 13/00
U.S. Cl. 204—181             12 Claims

ABSTRACT OF THE DISCLOSURE

In an electrodeposition coating method using a coating solution containing a water-soluble paint, an improved method for forming a coating film on an anode by using cloth of vegetable fibers as a diaphragm, separating into a cathode compartment alkaline cations for stabilizing a coating solution through said diaphragm and removing said alkaline cations to the outside of electrodeposition bath.

---

This invention relates to an improved method of electrodeposition coating, more particularly a method for electrodeposition coating while inhibiting accumulation of alkaline cations for stabilizing the electrodeposition coating solution.

Generally, the coating solution for electrodeposition coating consists of pigment and vehicles having a negative charge in an aqueous medium, and an alkaline cation for stabilizing the coating solution. The method for electrodeposition coating is the one comprising immersing an electroconductive anode and cathode into an aqueous bath of such a coating solution, passing an electric current through said anode, the bath, and the cathode to deposit the pigment and vehicle having the negative charge on the anode, and thereby coating the anode.

In such method, the pigment and vehicle are deposited on an article serving as anode and removed from the coating bath, while the alkaline cations are retained in the bath and as a result are accumulated gradually therein. Accumulation of the alkaline cations gives rise to an increase in pH of the bath and decreases in the efficiency of coating, for example, weight of coating film per unit electricity consumed, and decrease in the throwing power. At the same time, the properties of the deposited film, for example, gloss and evenness or smoothness of the film surface are made uneven. Thus, such accumulation makes the method very inconvenient. Such inconvenience makes remarkably troublesome, in particular, the control of continuous method for electrodeposition coating comprising passing a number of articles through the bath by means of a conveyor system.

As the methods for solving such a problem, there have been proposed a method using an ion dialysis means and a method using an electrolytically negative diaphragm or particularly cation exchange resin so as to remove alkaline cations to the outside of the bath, or a method for adjusting the elevated pH by feeding to the bath an alkaline-deficient. The present invention relates, among these methods, to an improved method using the electrolytically negative diaphragm, which is hereinafter referred to as "diaphragm method."

The diaphragm method is carried out by providing an electrolytically negative diaphragm capable of passing cations but hardly capable of passing anions around a cathode to separate a coating solution from catholyte solution. Accordingly, in the electrodeposition coating, the pigment and the vehicle having the negative charge deposition in the anode, that is, the surface of article, and at the same time, alkaline anions added thereto for stabilizing the coating solution, for example, ammonia, organic amines, sodium hydroxide, potassium hydroxide, etc., and the cations originally present in the coating solution move into the cathode compartment through the electrolytically negative membrane and concentrated therein. As a result, the equilibrium among the pigment and vehicle having negative charge and cations in the coating solution is always kept constant, and also pH of the coating solution in the electrodeposition bath is kept almost constant.

Accordingly, in conducting the electrodeposition coating continuously in an industrial scale, only supplementation of the pigment and vehicle, which are consumed by the electrodeposition coating, to the coating solution in the bath and removal of alkaline components which are increased in the cathode compartment, to the outside of the bath are only to be carried out. Thus, the control of the coating bath becomes very simple. In order to put the electrodeposition coating of this kind in practice, various electrolytically negative diaphragms consisting mainly of synthetic resin, for example, ion exchange resin diaphragm, have been heretofore proposed, but the requirements for electrolytically negative diaphragm, that is, (1) ability of passing cations but not anions; (2) easy processability; (3) good durability; (4) low expense, etc., have not been sufficiently met up to now.

Thus, the object of the present invention is to solve these problems by using a new electrolytically negative membrane and to provide a convenient method for electrodeposition coating.

The object of the present invention can be attained by using cloth of vegetable fibers, for example, seed fibers (cotton, etc.), phloem fibers (flax or linen, hemp, china grass, ramie, jute, etc.), leaf fibers (Manila hemp, New Zealand flax, etc.), fruit fibers (coconut, etc.) and the like, or cloth of mixed fibers or interwoven cloth of these individual fibers as the electrolytically negative diaphragm.

When the vegetable fibers are immersed in an aqueous solution, the fibers generally swell and the volumes of the fibers are increased. However, the fibers have a little tendency of swelling in a longitudinal direction of the fibers, but tend to considerably swell in a direction perpendicular to the lengths of fibers. As a result, when the cloth compactly woven with these vegetable fibers is immersed in an aqueous solution, the compactness of the cloth is so much increased that the pigment and the vehicle in the coating solution are not readily passable through the cloth.

Further, as the vegetable fibers show the negative charge, the cloth of such vegetable fibers can be provided with such characteristics of the electrolytically negative diaphragm, that is, a selective permeability for cations. The characteristics of such cloth of vegetable fibers can very satisfactorily meet those required for the electrolytically negative diaphragm in the diaphragm method. That is to say, the pigment and vehicle having the negative charge in the coating solution cannot pass through said cloth due to the compactness of swollen cloth and the negative charge of the cloth, whereas the alkaline cations added thereto for stabilizing the coating solution can readily pass through the diaphragm only by applying an electrical potential between the anodic article and the cathode because the diaphragm has the selective permeability for cations or the sizes of alkaline cations are much smaller than those of particles of said pigment and vehicle. Further, the cloth of vegetable fibers is very simple in handling, as compared with the ion exchange resin diaphragm now used as the electrolytically negative diaphragm, and is low in cost and excellent in durability. Thus, it is very advantageous in an industrial scale to use the cloth of vegetable fibers having such characteristics of the electrolytically negative diaphragm in the diaphragm method.

Among these vegetable fibers, the phloem fibers and the leaf fibers, for example, hemp fibers, have higher tensile strengths than those of other fibers and also have higher durability in the aqueous alkaline solution, and thus are most preferable as electrolytically negative diaphragm.

It is not always necessary to use in the present invention the cloth consisting singly of vegetable fibers, but synthetic fibers having a higher tensile strength can be used together with the vegetable fibers. By the simultaneous use of the vegetable fibers and the synthetic fibers, the strength and durability of the cloth are much intensified. In the cloth prepared by weaving the mixedly spun vegetable and synthetic fibers or interweaving the vegetable fibers and synthetic fibers respectively, the compactness of the cloth can be increased by the swelling pressure of the vegetable fibers in the aqueous solution and the strength and durability of the synthetic fibers proper can be imparted to the cloth.

The present method for the electrodeposition coating is carried out in the bath using the diaphragm, wherein an anodic article to be coated is isolated from a cathode by a diaphragm to provide the so-called anode compartment and cathode compartment in the electrodeposition bath; a coating solution dispersed in an aqueous medium is supplied into the bath; and the pigment and vehicle having the negative charge are deposited onto the article by passing an electric current through both electrodes. At that time, the alkaline components having the positive charge pass through the diaphragm and are collected in the cathode compartment. It is possible to conduct a continuous coating for a prolonged period of time by replacing the catholyte solution having the accumulated alkaline components with a fresh solution.

It is also possible that the solution in the cathode compartment is the same coating solution as that in the anode compartment. However, it is preferable to conduct the electrodeposition by supplying water or more preferably deionized water into the cathode compartment, and aqueous coating solution into the anode compartment.

The alkaline cations accumulated in the cathode compartment can be exchanged with water, whereby the accumulation of alkaline cations can be prevented.

Thus, the electrodeposition can be continuously carried out only by supplying the coating solution into the anode compartment, and water into the cathode compartment respectively.

In order to increase the surface area of the diaphragm consisting of the vegetable fibers and make the volume of the cathode compartment smaller than that of the anode compartment, it is advantageous to use the cathode compartment of cylindrical shape and encase a cathode therein. Further, it is possible to electrodeposit an article of larger size with a larger volume of coating solution by providing a plurality of cathodes in the bath. To attain this purpose, the anodic article is continuously passed through the bath by means of a conveyor system and the aqueous alkaline solution in the cathode compartment is continuously exchanged with water, whereby the electrodeposition coating can be carried out continuously.

Further, when a cathode compartment consisting of U-bent hose of cloth of vegetable fibers, in which an electroconductive cathode is provided, is used in the electrodeposition as shown in FIG. 4, the removal of catholyte solution to the outside of the bath can be facilitated. That is to say, when water or deionized water is supplied to the hose-shaped cathode compartment from one end thereof, the catholyte solution can be readily discharged from the other end thereof.

FIG. 1 shows a vertical view of an electrodeposition apparatus wherein the present invention is embodied; FIG. 2 is a plan view of FIG. 1 where six cathode compartments are provided; FIG. 3 is a side view of FIG. 1; and FIG. 4 is a side view of the electrodeposition apparatus wherein a U-shaped cathode compartment is used.

In the figures an article 5 to be coated is suspended from a conveyor 1 wtih intervention of an insulator 3 therebetween. A collector 4 is connected to a bus bar 2 which is in turn connected to the positive terminal of the direct current source 9. Numeral 7 is a cathode compartment consisting of cloth of vegetable fibers, and a cathode plate 8 connected to the negative terminal of the direct current source 9 is placed in said cathode compartment 9. Numeral 10 is a coating solution contained in the electrodeposition cell. The article 5 undergoes electrodeposition by passing the electricity between both electrodes.

Numeral 12 is a pipe for supplying water to the cathode compartment, and numeral 13 is a pipe for discharging the catholyte solution from the cathode compartment.

The following examples are illustrative of the present invention, but the present invention is not limited to these examples. The parts or percent indicated in the examples are by weight.

EXAMPLE 1

Added to 100 parts of water-soluble alkyd resin (acid value: 40) were 25 parts of Cellosolve, 8.3 parts of a 70% aqueous solution of triethyl amine, and 66.7 parts of deionized water. Further, added to the thus water-solubilized resulting varnish (50% concentration) was 466 parts of deionized water to dilute the concentration of the solution to 15%. Further, amine was added thereto to adjust pH to 7.4. The varnish containing no pigments served as an electrodeposition coating solution. 900 cc. of the resulting aqueous solution was taken into a 1 l. iron vessel, in which those having a diameter of 3 cm. and being prepared by double-weaving hemp fibers was bent and immersed to provide a cathode compartment. An iron plate having a dimension of 2 cm. x 16 cm. was inserted into the cathode compartment and served as a cathode. Deionized water was used as a catholyte solution. An iron plate having a surface area of 100 cm.$^2$ was immersed in the coating solution, and the electrodeposition coating was conducted with a constant current of 200 ma. for one minute. To keep the volume of the coating solution constant, deionized water was supplemented to the coating solution of the bath at every time when 30 pieces of the iron plates were subjected to the electrodeposition. The nonvolatile matters in the coating solution were reduced to a content of 11% when 120 pieces of the iron plates were subjected to the electrodeposition under such conditions, while no change in pH was observed at all. Further, no change was observed from the original state of the electrodeposited film. From this result, it is evident that the amines accumulated in the coating solution were removed from the coating solution into the cathode compartment.

EXAMPLE 2

A hose having a diameter of 3 cm. and being prepared by plain weaving cotton fibers was used as the cathode compartment and the same coating solution as in Example 1 was used. Electrodeposition was conducted in the same way as in Example 1. Similar result as in Example 1 was obtained. That is, no change in pH was observed and the electrodeposited film was obtained in as good a state as the original.

EXAMPLE 3

Charged into a coating cell having a content of 3 tons as illustrated in FIGS. 1, 2 and 4 were 750 kg. of a coating solution having the following composition and 2,250 kg. of deionized water. Wheels having a surface area of about 0.4 m.$^2$ each were suspended from the conveyor as shown in the drawing, and 5,000 wheels were subjected to the electrodeposition coating by means of a conveyor system. As the electrolytically negative diaphragm of the cathode compartment, the cloth prepared by plain weaving the linen fibers (Shachi No. 1, a trademark of the cloth made by Teikoku Seni K.K., Japan) was knitted into a cylindrical hose and used. Three diaphragms were fixed to the walls and the bottom of the coating cell as shown in FIGS. 2 and 4. Steel bands having a width of 15 cm. each were used as cathodes as shown at 8 in the figures. Deionized water was used as the catholyte solution.

Composition of electrodeposition coating solution

| | Parts by weight |
|---|---|
| Red iron oxide | 8.5 |
| Carbon black | 1.6 |
| Aqueous solution of alkyd resin (50%) stabilized with triethylamine, acid value being 40 | 60.0 |
| Cellosolve | 8.0 |
| Deionized water | 22.0 |
| | 100.0 |

The control limit of nonvolatile matters in the coating solution in the bath was made to have 10%±0.5%, and the control was carried out by supplementing the coating solution and deionized water to the anode compartment. The pH of the catholyte solution was increased to 10–12 in a day, and thus the catholyte solution was exchanged with deionized water every day.

When 5,000 wheels were subjected to the electrodeposition, pH of the coating solution was changed to 7.4 from initial 7.6, and no change was observed in the electrodepositability of the coating solution. Good coated films were also obtained. The solution taken out of the cathode compartment was always clear, and the penetration of the coating solution into the cathode compartment was not observed. Further, the electrodeposition voltage of the present method was not at all differed from that of the case where none of the present method and the diaphragm was used, that is, the case where the electrodeposition was conducted using the coating vessel as a cathode.

It is clear from the foregoing results that the present method is industrially advantageous.

EXAMPLE 4

Cloth prepared by plain weaving ramie fibers was knitted into a cylinder and used as the electrolytically negative diaphragm, and the same coating solution as in Example 3 was used. The same articles as in Example 3 were subjected to the electrodeposition in the same way as in Example 3, and the similar results were obtained. Removal of the catholyte solution was continuously conducted by continuously charging deionized water into the compartment from the pipe 12 and discharging the catholyte solution from the outlet 13.

EXAMPLE 5

The procedure as in Example 3 was repeated using the coating solution of the following composition, and the similar good results were obtained as in Example 3.

Composition of electrodeposition coating solution

| | Parts by weight |
|---|---|
| Red iron oxide | 2.5 |
| Phenol-modified alkyd resin (concentration: 50%) stabilized by triethyl amine, acid value being 50 | 15.0 |
| Cellosolve | 1.8 |
| Deionized water | 80.7 |
| | 100.0 |

What is claimed is:
1. An improved method for electrodepositing a film on an anode where the electrodeposition coating is conducted in a bath of an aqueous coating solution consisting of a vehicle and pigment both having negative charge and alkaline cations for stabilizing these vehicles and pigment dispersed in an aqueous medium, which comprises using cloth of vegetable fibers as a diaphragm thereby to separate an electrodeposition coating bath into a cathode zone and an anode zone, providing a cathode in the cathode zone and an electroconductive article to be coated as an anode in the anode zone, passing electricity through said electrodeposition coating bath and between the anode and cathode while water is supplied to the cathode zone, thereby depositing film-formable components from the coating solution onto a surface of the article and simultaneously separating said alkaline cations into the cathode zone through said diaphragm and removing the same to outside of the bath.

2. A method according to claim 1 wherein cloth of cotton fibers is used as a diaphragm.

3. A method according to claim 1, wherein cloth of phloem fibers is used as a diaphragm.

4. A method according to claim 1, wherein cloth of leaf fibers is used as a diaphragm.

5. A method according to claim 3, wherein cloth of linen fibers is used as a diaphragm.

6. A method according to claim 3, wherein cloth of hemp fibers is used as a diaphragm.

7. A method according to claim 3, wherein cloth of ramie grass fibers is used as a diaphragm.

8. A method according to claim 4, wherein cloth of Manila hemp fibers is used as a diaphragm.

9. A method according to claim 1, wherein interwoven cloth of several kinds of vegetable fibers is used as a diaphragm.

10. A method according to claim 1, wherein interwoven cloth of vegetable fibers and synthetic fibers having a low degree of swellingness and a high tensile strength, when wetted, is used as a diaphragm.

11. A method according to claim 1, wherein a plurality of cathode zones are used, depending upon the shape of electrodeposition coating bath.

12. A method according to claim 1, wherein the cathode zone is shaped into a U form and the alkaline cations separated into the cathode zone are continuously removed therefrom by adding water to one end of said electrode zone.

References Cited

UNITED STATES PATENTS

| 1,719,984 | 7/1929 | Klein et al. | 204—301 |
| 3,230,162 | 1/1966 | Gilchrist | 204—181 |
| 3,304,250 | 2/1967 | Gilchrist | 204—181 |
| 3,419,488 | 12/1968 | Cooke | 204—181 |

FOREIGN PATENTS 1,019,658   2/1966   Great Britain.

JOHN H. MACK, Primary Examiner

A. C. PRESCOTT, Assistant Examiner

U.S. Cl. X.R.

204—301

UNITED STATES PATENT OFFICE
CERTIFICATE OF CORRECTION

Patent No. 3,496,083    Dated February 17, 1970

Inventor(s) Hitoshi Kawai, et al.

It is certified that error appears in the above-identified patent and that said Letters Patent are hereby corrected as shown below:

In Column 1 in the heading after "by mesne assignments" insert --50% to Nippon Paint Co., Ltd., Osaka, Japan and 50%--.
same Column 1, line 8, "a corporation" should read -- both corporations --.

SIGNED AND SEALED
AUG 25 1970

(SEAL)
Attest:

Edward M. Fletcher, Jr.
Attesting Officer

WILLIAM E. SCHUYLER, JR.
Commissioner of Patents